L. A. M. PHELAN ET AL

March 21, 1933. TEMPERATURE CONTROL APPARATUS Re. 18,771

Original Filed Jan. 29, 1923 2 Sheets-Sheet 1

Inventors:
Louis A. M. Phelan
Clifford Hotchkiss
By Jones, Addington, Ames & Seibold
Attys.

March 21, 1933. L. A. M. PHELAN ET AL

TEMPERATURE CONTROL APPARATUS

Re. 18,771

Original Filed Jan. 29, 1923 2 Sheets-Sheet 2

Inventors:
Louis A. M. Phelan
Clifford Hotchkiss
By Jones, Addington, Ames + Seibold
Attys.

Reissued Mar. 21, 1933

Re. 18,771

UNITED STATES PATENT OFFICE

LOUIS A. M. PHELAN, OF CHICAGO, ILLINOIS, AND CLIFFORD HOTCHKISS, OF MINNEAPOLIS, MINNESOTA, ASSIGNORS, BY MESNE ASSIGNMENTS, TO MINNEAPOLIS-HONEYWELL REGULATOR COMPANY, OF MINNEAPOLIS, MINNESOTA, A CORPORATION OF DELAWARE

TEMPERATURE CONTROL APPARATUS

Original No. 1,764,344, dated June 17, 1930, Serial No. 615,530, filed January 29, 1923. Application for reissue filed January 27, 1932. Serial No. 589,288.

This invention relates to temperature control apparatus and more particularly to apparatus and devices used for controlling or regulating temperature by means of controlling the amount of combustion that takes place in a furnace using oil or other fluid as a fuel.

It is common practice to introduce into the fire boxes of furnaces a spray of oil or other liquid fuel by means of a nozzle and a conduit connected to a suitable source of supply which is maintained under pressure by a pump, preferably an electric motor operated pump.

One object of this invention is to provide a system for automatically regulating and controlling the operation of an electric motor operated pump when used in connection with the above indicated type of oil burning apparatus.

In former attempts to provide a regulating system of the above character, it has been the usual practice to make use of electromagnetic or motor operated relays. The use of such relays is undesirable in many cases because of their complicated structure, and because of the widely varying frictional losses occurring at their various mechanical bearings. Such types of relays moreover are usually fitted with commutators or contacting parts which are exposed to the atmosphere and are consequently very unreliable in operation since these contacting parts very readily become oxidized and contaminated.

A more particular object of this invention therefore is to provide an automatic system for regulating combustion which eliminates the use of magnetic and motor operated relays and which also eliminates the use of all exposed contacts.

A further object of this invention is to provide a reliable thermal relay capable of use in the above indicated type of control system.

In certain types of oil burning systems as constructed at the present time, no provision is made for stopping the flow of the fluid fuel in case the intended ignition and combustion for any reason do not take place in the fire box. Consequently, it is possible for a great excess of combustible material to accumulate in the fire-box unless the system is very carefully and constantly attended. This may at times result in a serious fire hazard, as for instance, in case a gas pilot flame is used in the furnace for ignition purposes. If the pilot flame for any reason is accidentally extinguished and later the oil pump is started in operation, the fire box will become flooded with fuel.

Hence, another particular object of this invention is the provision of a device capable of use in the above indicated type of control system for positively stopping the operation of the fuel pump when ignition and combustion of the fuel does not actually take place.

A further object of our invention is to provide a system and apparatus of the above described character, which are comparatively simple in construction and easy to install and which do not readily get out of order.

Further objects and advantages of the invention will appear upon reference to the following specification and appended claims, taken together with the drawings, in which Figure 1 is a diagrammatic view of the system comprising the invention as used in connection with a heating furnace and also showing in a perspective view certain devices used in connection with the system;

Figure 1:
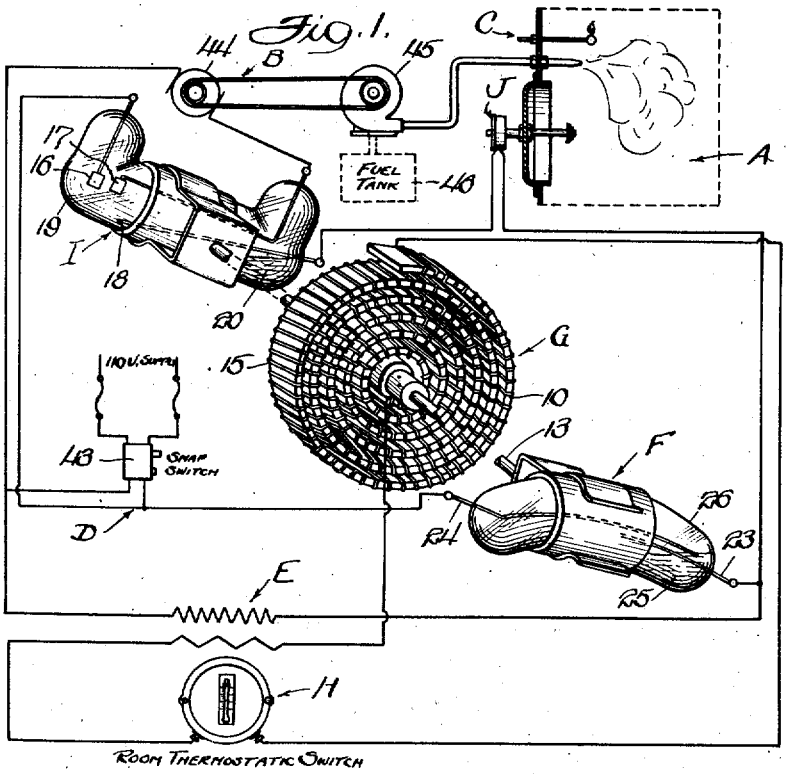

The system as shown in Fig. 1, and its operation, will first be outlined in a general way before proceeding with a more detailed description of its parts and operation.

Some of the elements of the system as used in connection with the control of the combustion of fuel oil in an ordinary type of domestic heating equipment include a fire box or combustion chamber A, in which a spray of oil supplied by an oil pumping equipment B is burned upon being ignited by a gas or other pilot light C. The oil pumping equipment B is preferably electrically driven from a source of power D, such for example, as the ordinary 110 volt lighting mains which are initially connected to the primary winding of a step-down transformer E through a switch F.

From the secondary winding of the transformer E, power is furnished to a circuit including a winding on a thermostatic relay element G and a room thermostatic switch H. Providing the room thermostatic switch H is closed, the current through this circuit will at first cause heating in the thermostatic relay element G which will in a short time serve to rotate the switch F into an open circuit position and also at the same time serve to rotate a switch I into a closed circuit position. The switch I will then serve to connect the motor of the pumping equipment B directly in series with the power supply at D and thus the pump will be put into operation.

The switch F now being in open circuit position, current through the primary of the transformer E must be supplied through another circuit if the thermostatic relay element G is to remain heated sufficiently to hold the switch I in its closed circuit position, as required for the continued operation of the fuel pump. In order to serve this purpose and also to provide a safety device, another thermostatic switch J is mounted at the combustion chamber A and is arranged to maintain a closed circuit condition only while combustion is actually taking place within the combustion chamber A. It will be seen from the diagram in Fig. 1 that the initial circuit connection through the switch F is thus later replaced by a connection through the switches J and I but, if for any reason the fuel within the combustion chamber A does not ignite, this circuit will remain open and the thermostatic relay element G will not continue to be heated. As a consequence, the switches F and I will be gradually turned back to their initial positions, as illustrated in Fig. 1, when the thermostatic relay element G becomes cooled. This action will result in the stopping of the motor pumping equipment and thus the accidental accumulation of large amounts of fuel in the fire box will be avoided.

The various devices which are included in the system will now be described more in detail.

Figure 6:
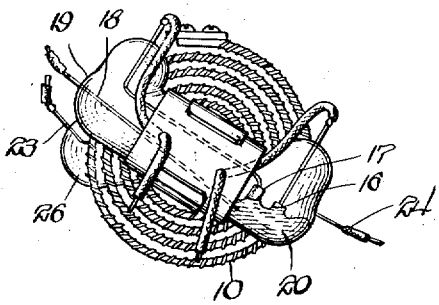
Fig. 6 is an end view of the device shown in Fig. 5.
Figure 5:
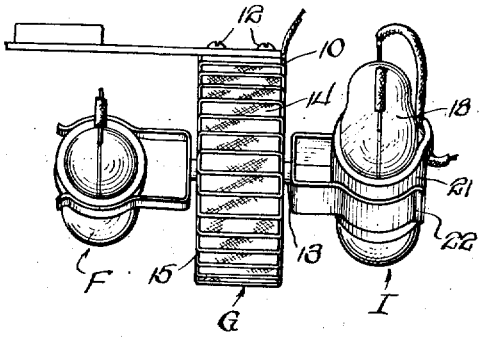
Fig. 5 is an elevational view of the thermostatic relay device, which is shown in perspective in Fig. 1.

The thermal relay as used with this system is shown in detail in Figs. 5 and 6 and by a schematic perspective view in Fig. 1 and comprises a spirally wound bi-metallic ribbon 10 which is fixed at one end to a support such as at 11 by screws 12. The spiral ribbon 10 may be composed of superimposed strips of any two different metals or elements, preferably brass and iron which are selected because of their widely different coefficients of expansion. When the temperature of the spiral ribbon 10 is altered, its shape will also be altered due to the different coefficients of expansion of the metals of which it is made. To the other end of the spiral ribbon 10 a stub shaft 13 is fixed in any suitable manner as by soldering. Upon the stub shaft 13, one or more switches as indicated at F and I may be mounted. In Fig. 1 the stub shaft 13 is shown in extended and broken form for clearness of illustration.

The spiral ribbon 10 before being wound into the spiral shape illustrated is first covered with an insulating fabric 14, such for example as asbestos cloth saturated with any desirable insulating heat resisting adhesive, such as thick linseed oil. After being covered with this insulating fabric, the ribbon 10 is then provided with a resistance winding 15 through which an electrical current may be passed for causing heating and consequent deformation of the spiral ribbon. The dimensions of the resistance winding 15 may be designed to accommodate the particular current which is used and also to give the desired speed of operation or sensitiveness to the device. If a resistance winding producing a small heating effect is used, an appreciable time lag may be secured in the operation of the relay.

The switches F and I as shown comprise hermetically sealed fluid type contactors which serve to make and break circuits by the movement of a body of conducting liquid, such as mercury, into and out of bridging relation with fixed electrodes within the switch containers. The switch I is provided with a pair of fixed electrodes 16 and 17, which may be of substantial dimensions capable of carrying the full current used for operating the motor of the pumping equipment above described. This motor circuit may be termed the main circuit while the circuit in which the resistance winding 15 is included may be termed a control circuit. This switch I as shown is also provided with a third fixed electrode 18 of somewhat lighter construction than the electrodes 16 and 17 and which is used at certain times for the purpose of conducting current to the resistance winding 15 of the thermostatic relay element G in the above described system. Thus the switch I is common to two circuits. The electrodes 16, 17, and 18, as shown, are fixed in the walls of a container 19, preferably formed of glass and containing a body of mercury 20 which may come into bridging relation with all three of the electrodes 16, 17 and 18, when the container 19 is tilted the proper amount. As shown in Fig. 6, the container 19 is tilted to an angle such that the body of mercury 20 is in bridging relation with all of the electrodes while in Fig. 1 the mercury is in bridging relation with none of the electrodes. The container 19 is preferably surrounded with protecting means, such as a rubber band 21, which in turn is embraced by a spring clip 22 mounted upon the stub shaft 13.

The switch F as used in the above described system is also for the purpose of making and breaking the current supplied to the circuit through the resistance coil 15 at certain times and is provided with a pair of electrodes 23 and 24, which are adapted to be bridged by a body of mercury 25, as is best shown in Fig. 1. The electrodes 23 and 24 are also fixed in the walls of a container 26, preferably formed of glass and mounted upon the stub shaft 13 in a manner similar to the mounting of the container of the switch I.

As will be readily understood when the current is passed through the resistance winding 15, the spiral ribbon 10, because of the heat generated, will become altered in shape in a manner such that the shaft 13 and the switches F and I will be rotated through a small angle about their axes. It will be noted that the switches F and I are attached to the stub shaft 13 at an angle such that the switch F will be in its closed circuit position at times when the switch I is in its open circuit position and conversely that when the switch I is turned to its closed circuit position, the switch F will be in its open circuit position.

It will be also noted in Fig. 1 that the container 26 of the switch F is formed in a slightly arched or curved shape so that the container must be tilted a considerable amount beyond the horizontal before the body of mercury 25 will roll to the opposite end of the container. This construction permits the actuation of the switch F at a predetermined time interval after the actuation of the switch I and for particular reasons to be stated hereinafter.

Figure 4:
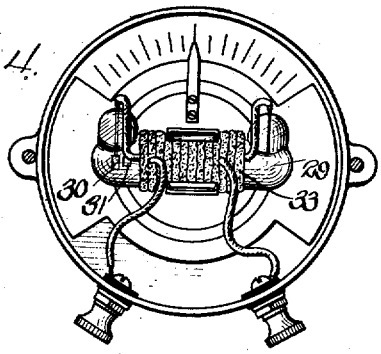
Fig. 4 is an end view with the cover removed of the device shown in Fig. 3.
Figure 3:
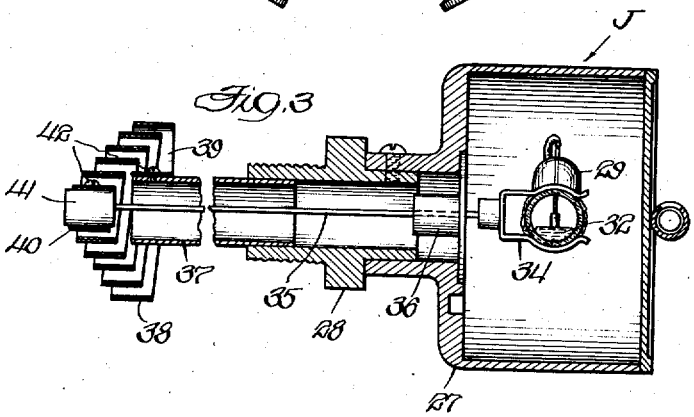
Fig. 3 is a longitudinal sectional view of a thermostatic switch used at the furnace fire box in the system shown in Fig. 1.

The thermostatic switch J, shown in Figs. 3 and 4, and which is mounted at the combustion chamber A will now be described in detail. A housing 27 is provided with a hollow bushing 28 for insertion in a suitable opening formed in a furnace door or other suitable portion of the furnace fire box. Within the housing 27 an electric contactor 29 is provided, which is similar in construction to the contactor switch I described above, but is provided with only two electrodes 30 and 31, which correspond in position respectively to the electrodes 16 and 17. A body of mercury 32 is adapted to roll into contact with the electrodes 30 and 31 to complete a circuit therethrough when the contactor is tilted sufficiently in the proper direction. The contactor may be surrounded with a protecting means 33, preferably formed of asbestos twine in this instance, in order to resist the prevailing temperatures occurring in the neighborhood of the fire box A. The protective means 33 is firmly embraced by a spring clip 34, which is fixed to a shaft 35, which in turn is mounted in bearing 36 fixed in the housing 27. From the bearing 36 the shaft 35 extends out of the housing coaxially through the hollow bushing 28 and also through an elongated tubular support or extension 37 of the hollow bushing 28, and into the fire box A. It will be noted that the bore of the tubular support 37 is of a diameter such that the shaft 35 will always be in a widely spaced relation with the walls of the support 37, thus eliminating frictional resistance to the free movement of the shaft even if the parts should become seriously warped in the heated furnace. A spiral thermostatic bi-metallic element 38 has a fixed end 39 attached to the end of the tubular support 37 and a relatively free end 40 attached to the shaft 35 through a hub 41. These ends of the spiral element 38 may be removably attached by any suitable means, such as by screws 42, as shown.

As will be readily understood, when the spiral element 38 is mounted within a fire box, any substantial increase in temperature caused by combustion within the fire box will result in an alteration of the shape of the spiral element, such as will cause the shaft 35 and the contactor 29 to be turned about their axes. The spiral element 38 may be designed with a sufficient number of turns composed of associated strips of the proper cross section of brass and iron or other elements, such that when any predetermined increase in temperature occurs within the combustion chamber, the contactor 29 will be sufficiently tilted to enable the body of mercury 32 to roll into bridging relation with the electrodes 30 and 31 and thus maintain a circuit in closed condition. It will be noted that the spiral element 38 is shown wound in a conical shape. This particular shape has several distinct advantages over the more common flat spiral form when used with this construction, as for example, the various turns of the spiral are exposed to a greater extent to the air currents surrounding the device and hence are more quickly affected by any change in temperature. This particular conical shape also permits the fixing of the end 39 to the tubular extension 37 in a rigid manner and at the same time permits the end 40 to be fixed to the shaft 37 at a convenient exposed location. This construction results in a compact, simple device having but a single bearing 36 and consequently subject to only slight variable frictional losses when operated. Furthermore, no bearings or fragile parts are located within the heated region in the fire box where they would be subject to rapid deterioration.

When the thermostatic switch J is installed it is necessary to adjust the angular position of the contactor 29 so that it will be in open circuit position when the spiral element 38 is cold and no combustion is taking place and so that it will be in closed circuit position when the combustion chamber becomes heated after ignition takes place. The container 29 may be adjusted at this desired angular position by merely turning the bushing 28 with the entire housing 27 until the body of mercury 32 just rolls to the open circuit position upon the occurrence of the predetermined desired drop in temperature within the combustion chamber.

The room thermostatic switch H may be of any desired suitable type, such for example as is shown and described in the copending application of Louis A. M. Phelan and Clifford Hotchkiss, Serial No. 544,589, filed March 17, 1922. This switch serves to open an electrical circuit when the temperature of the room or compartment in which it is located rises to a desired predetermined value and also serves to close the circuit again after a predetermined drop in the temperature occurs.

Figure 2:
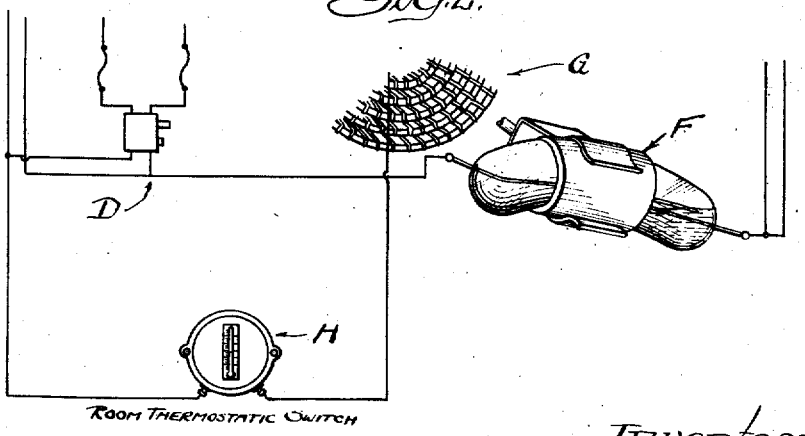
Fig. 2 is a diagrammatic view showing a portion of the system in a manner similar to the showing in Fig. 1, but showing the system connected without the use of a transformer.

In certain instances it may be cheaper and more convenient to install wiring to the room thermostatic switch which is particularly designed for a lower voltage than is used for the motor circuit. The transformer E shown in Fig. 1 makes possible the use of lower voltage in the circuit of the room thermostatic switch, if desired. However, the use of the transformer E is not essential to the operation of the system and may be dispensed with by using the connections shown in Fig. 2, where all of the circuits make use of power at the same voltage.

The complete operation of this system will now be described by outlining the successive action of each of the devices upon placing the system in operation.

Assuming that the system has been put into proper order, as shown in Fig. 1 and that the gas pilot C has been lighted, it is merely necessary for the operator to push a snap switch 43 in order to have combustion take place in the fire box A. From the switch 43 current is lead through the switch F, now closed, and through the primary winding of the step-down transformer E. From the secondary winding of the transformer E, current will be led through the room thermostatic switch H (now assumed to be closed since the room to be heated is cold) and also through the resistance winding 15 upon the thermostatic element G. The current through the resistance 15 will cause a heating of the spiral element 10 and the resulting change in shape of this element will serve to gradually turn the switches I and F. As the switch I just passes its horizontal position, the body of mercury 20 will roll into bridging relation with the three electrodes 16, 17 and 18. The bridging of the electrodes 16 and 17 will place a pump motor 44 in series with power from the switch 43. In the meantime the switch F will also be turned and the body of mercury 25 will roll out of bridging relation with the electrodes 23 and 24 into the open circuit position. The motor 44 now being in operation, a spray of fuel will be supplied by a fuel pump 45 from a tank 46 to the fire box A and in the ordinary course this spray would be ignited by the pilot flame C. The heat of the burning spray of fuel will serve to actuate the thermostatic switch J and permit it to turn into a closed circuit position, as above described. The circuit to the primary of the transformer E through the switch F having already become interrupted because of the turning of the switch F will now be resumed through the thermostatic switch J in connection with the switch I, the circuit through the switch I following through the electrode 18, the body of mercury 20 and the electrode 16 to the switch 43.

As above described, the container 26 of the switch F is made in a curved form so that the body of mercury 25 rolls to the open circuit position only when a definite time interval has elapsed after the actuation of the switch I. This time interval is sufficient to permit the thermostatic element G to remain heated until after combustion takes place and the fire box A has become sufficiently heated to actuate the thermostatic switch J. After the actuation of the thermostatic switch J, the switch F is turned sufficiently to open the circuit therethrough and without any prolonged interruption of the flow of current through the resistance winding 15.

When the room in which the thermostatic switch H is placed becomes heated to the desired temperature, the switch H will open the circuit through the resistance winding 15 and consequently permit the thermostatic element G to become cooled. As the thermostatic element G becomes cooled, current to the pump motor 44 will be interrupted by the actuation of the switch I which will now be turned to open circuit position. When the temperature of the room has dropped for a desired predetermined amount, the switch H will serve to close again the circuit through the resistance coil 15 and the operation of the system will be repeated as above described. In this manner after the operator merely has operated the single snap switch 43, the heating equipment and the room temperature will be entirely automatically controlled and regulated within defined limits, depending upon the sensitiveness of the thermostatic switch H. The automatic control may be stopped when desired by turning off the power at the switch 43.

It will be noted that when the switch F is restored to its normal position, as illustrated, the body of mercury 25 will flow into the position shown only when a certain time interval has elapsed after the movement of the body of mercury 20 in the switch I. This is because of the curved shape of the container 26 of the switch F and serves to introduce a substantial lag in the operation of the system thus preventing the starting and stopping of the pump motor 44 at too frequent intervals in case the thermostatic switch H is very sensitive to slight changes in temperature.

In the operation of the system as above described, it has been assumed that the intended ignition and combustion have taken place in the fire box A. However, in case the snap switch 43 is thrown at a time when the pilot light C is not lighted, or if for any other reason combustion of the fuel does not take place, the continued operation of the fuel pump would allow an excess of the fuel to accumulate within the fire box and thus create a very serious fire hazard. In the system as shown, when ignition does not take place, the thermostatic switch J will remain cold and in its open circuit position and consequently when the switch F is also turned to open circuit position, no means will remain for heating the resistance coil 15, and consequently the switches F and I will soon return to their initial positions thereby interrupting the circuit to the motor 44. It will thus be evident that the pump motor will at no time continue in operation for more than a short interval unless combustion takes place and the thermostatic switch J is heated sufficiently to turn to its closed circuit position. Hence, the possibility of accidental accumulation of large amounts of fuel in the fire box is avoided.

We have shown in our control system the use of electric contactors, such as the contactor 29 comprised in the thermostatic switch or safety control mechanism J. Of course, we do not desire that our invention be so limited except where an electric contactor is specifically called for. The terms "electric contactor" or "mercury electric contactor" as employed herein, therefore, refer to a device comprising a sealed container in which electrodes are disposed that are spaced from each other and which are adapted to control the making and breaking of the external electrical circuit to which said electrodes are connected through the medium of a movable contact member, such as the body of mercury 32 of the contactor 29. Other forms of electric contactors, of course, may be used such as are well known in the art, but it is to be understood that the movable contact member, such as the body of mercury 32, is the medium through which the electrical circuit is made and broken between the spaced electrodes housed within the container.

While we have shown and described several embodiments of our invention, it is to be understood that many modifications may be made therein without departing from the spirit and scope of the appended claims, and we desire that only such limitations shall be imposed upon our invention as are specifically pointed out in the claims and such as are required by the prior art.

Having thus described our invention, what we claim as new and desire to secure by Letters Patent in the United States, is:

1. A system for controlling a fuel burning device and comprising a fuel supply means, an electric motor therefor, a control circuit for said motor, a room thermostatic switch, an electrically heated relay the electric heated circuit of which is controlled by said room thermostatic switch and is connected in series circuit therewith, and a common source of power supplying both said motor circuit and the circuit comprising said room thermostatic switch, said relay being provided with electric switching mechanism operated thereby for controlling said circuits.

2. A system for controlling the combustion of fuel comprising an electric fuel pump motor, a source of power, an electric heating element, a switch through which current is initially transmitted to said element, means for transmitting power to said element after combustion starts but acting upon the failure of ignition and combustion to open the circuit through said element, a common switch in circuit with both said motor and said means, and mechanical means responsive to the heating of said element for opening said first named switch and for closing said second named switch.

3. A system for controlling the combustion of fuel comprising an electric fuel pump motor, a source of power, an electric heating element, a room thermostat controlling the transmission of current to said element, a switch through which current is initially transmitted to said element, means for transmitting power to said element after combustion starts but acting upon the failure of ignition and combustion to open the circuit through said element, a common switch in circuit with both said motor and said means, and mechanical means responsive to the heating of said element for opening said first named switch and for closing said second named switch.

4. A system for controlling the combustion of fuel comprising an electric fuel pump motor, a source of power, an electric heating element, a switch through which current is initially transmitted to said element, means for transmitting power to said element after combustion starts, but acting upon the failure of ignition and combustion to open the circuit through said element, a common switch in circuit with both said motor and said means, and mechanical means responsive to the heating of said element for opening said first named switch and for closing said second named switch, said mechanical means upon becoming cool serving to restore said switches to their initial positions.

5. An electrical control system for an oil burner comprising a temperature control thermostat, a thermostatically controlled actuator, an electric heating element for said actuator the circuit of which is controlled by a circuit comprising said thermostat, a combustion chamber, electrically controlled means for supplying fuel thereto, an electric switch controlling said fuel supplying means, said electric switch adapted to be held in closed position by said actuator when heated, and safety control means for controlling said electric switch to maintain the same in closed position as long as combustion obtains but permitting said electric switch to move automatically into open position upon failure of combustion.

6. An electrical control system for an oil burner comprising a temperature control thermostat, a thermostatically controlled actuator, an electric heating element for said actuator the circuit of which is connected in circuit with said thermostat, a combustion chamber, electrically controlled means for supplying fuel thereto, an electric switch controlling said fuel supplying means, said electric switch being controlled by said actuator, and safety control means constituting a thermo sensitive element influenced by combustion conditions obtaining in said combustion chamber, said safety control means controlling said electric switch to maintain the same in closed position as long as combustion obtains but permitting said electric switch to move automatically into open position upon failure of combustion.

7. A fuel burning device comprising a combustion chamber, means for supplying a fuel mixture into a zone of ignition therein, and an electrical control mechanism for preventing the continuous supply of the fuel mixture upon initial failure of combustion or failure of combustion conditions after being initiated, said control mechanism comprising an electrically heated thermostatic actuator, an electric switch controlling said fuel supply means and adapted to be held in closed position by said actuator when heated, and a thermostatic device responsive to temperature conditions obtaining in the combustion chamber for causing said switch to remain closed when combustion obtains and permitting said switch to open upon failure of combustion thereby precluding continuous operation of said fuel supply means.

8. In a control system for a fuel burning device comprising a combustion chamber, and electrically controlled means for supplying a fuel mixture into a zone of ignition therein, the combination with a temperature control thermostat, a thermostatically controlled actuator, an electrical heating element for said actuator the circuit of which is controlled by said thermostat, of an electric switch adapted to be held in closed position by said actuator when the latter is heated, said electric switch controlling the operation of said fuel supplying means when said thermostat is closed, and a safety control mechanism influenced by the combustion conditions obtaining within said combustion chamber for causing said electric switch to remain in closed position as long as combustion continues but permitting said electric switch to move to open circuit position upon initial failure of combustion or failure of continuous combustion within said combustion chamber.

9. In a control system for a fuel burning device comprising a combustion chamber, and electrically controlled means for supplying a fuel mixture into a zone of ignition therein, the combination with a temperature control thermostat, a thermostatically controlled actuator, an electrical heating element for said actuator the circuit of which is controlled by said thermostat, of an electric switch adapted to be held in closed position by said actuator when the latter is heated, said electric switch controlling the operation of said fuel supplying means when said thermostat is closed, and a safety control mechanism comprising a thermo sensitive element that is influenced by the temperature conditions obtaining within said combustion chamber, said safety control mechanism causing said electric switch to remain in closed position as long as combustion continues but permitting said electric switch to move to open circuit position upon failure of combustion within said combustion chamber.

10. A fuel burning device comprising a combustion chamber, means for supplying a fuel mixture into a zone of ignition therein, and an electrical control mechanism for preventing the supply of the fuel mixture upon initial failure of ignition or failure of combustion conditions after being initiated, said control mechanism comprising an electrical circuit having an electrically heated thermostatic actuator for controlling the operation of said fuel supplying means, a temperature control thermostat connected in said electrical circuit which also comprises the electric heater circuit of said actuator, and a safety control mechanism responsive to combustion conditions obtaining within said combustion chamber for controlling the operation of said fuel supplying means.

11. A fuel burning device comprising a combustion chamber, means for supplying a fuel mixture into a zone of ignition therein, and an electrically controlled mechanism for preventing the supply of the fuel mixture upon initial failure of ignition or failure of combustion conditions thereafter, said control mechanism comprising an electrical circuit having an electrically heated thermostatic actuator for controlling the operation of said fuel supplying means, a room thermostat controlling said electrically heated thermostatic actuator, an electric switch controlling said fuel supplying means and which is held in closed circuit position by said electrically heated thermostatic actuator when the latter is heated, and a safety control mechanism influenced by combustion conditions obtaining within said combustion chamber for causing said electric switch to remain in closed position as long as combustion conditions obtain within said combustion chamber but permitting said electric switch to move to open circuit position upon failure of combustion within said combustion chamber.

12. In an electrical control system for a fuel burning device comprising a combustion chamber, electrically controlled means for supplying a fuel mixture into a zone of ignition therein, and an electric switch for controlling the operation of said fuel supplying means, the combination with an electrically heated thermostat for actuating said electric switch to hold the same in closed position when said thermostat is heated, of a safety control mechanism sensitive to combustion conditions permitting said electric switch to move to open position upon initial failure of combustion or failure of combustion to continue thereafter but causing said electric switch to remain in closed position as long as combustion obtains within said combustion chamber.

13. In a control system for a fuel burning device comprising a combustion chamber, and electrically controlled means for supplying a fuel mixture into a zone of ignition therein, the combination with an electric switch for controlling the operation of said fuel supplying means, of an electrical control mechanism for controlling the operation of said electric switch to prevent the supply of the fuel mixture upon an initial failure of combustion or failure of combustion conditions after ignition, said control mechanism comprising a safety device embodying a casing, a mercury electric contactor housed in said casing and having a container, spaced electrodes fixed therein and a movable contact member to control the circuit between the electrodes, a thermal responsive device for controlling the movement of said movable contact member relatively to said fixed electrodes to close an electric circuit through said mercury electric contactor when said thermal responsive device is relatively hot and to open said circuit when said device is relatively cold, said thermal responsive device being supported upon and projecting outwardly from said casing and so disposed as to be subjected to temperature changes occurring within said combustion chamber and said casing being spaced from said thermal responsive device and disposed in a relatively cool region, said mercury contactor through the medium of said movable contact member controlling the operation of said first electric switch to break the electric circuit therethrough when said thermal responsive device is cold by reason of initial failure of combustion or failure of combustion conditions after ignition within said combustion chamber.

14. In a control system for a fuel burning device comprising a combustion chamber, and electrically controlled means for supplying a fuel mixture into a zone of ignition therein, the combination with an electric switch for controlling the operation of said fuel supplying means, of an electrical control mechanism for controlling the operation of said electric switch to prevent the supply of the fuel mixture upon an initial failure of combustion or failure of combustion conditions after ignition, said control mechanism comprising a control circuit and a safety device embodying a control switch connected in said control circuit and having a movable contact member, a thermal member sensitive to combustion conditions in said combustion chamber, and a connection between said thermal member and said control switch for controlling the movement of said movable contact member to close said control switch when said thermal member is relatively hot and to open said control switch when said thermal member is relatively cold, independently of all other conditions of the system.

15. In a control system for a fuel burning device comprising a combustion chamber, and electrically controlled means for supplying a fuel mixture into a zone of ignition therein, the combination with a control circuit for said fuel supplying means comprising a room thermostat initiating operation of said control circuit, of an electrical safety control mechanism for preventing the supply of fuel mixture upon an initial failure of ignition or failure of combustion conditions thereafter, said safety control mechanism comprising an electric switch disposed in a relatively cool region and including relatively movable contact members, a thermal responsive member so disposed as to be subjected to combustion conditions obtaining in said combustion chamber, and a connection between said thermal responsive member and said electric switch for effecting relative movement between said contact members to close said switch when said thermal responsive member is relatively hot and to open said switch when said thermal responsive member is relatively cold, independently of all other conditions of the system.

16. A fuel burning device comprising a combustion chamber, electrically controlled means for supplying a fuel mixture thereto, and a control circuit for said fuel supplying means comprising a room thermostat which initiates operation of said control system, and an electrical safety control mechanism for preventing the supply of the fuel mixture upon initial failure of ignition, said safety control mechanism comprising an electric switch including a container, spaced electrodes fixed therein, and a movable contact member to control the electric circuit through said spaced electrodes, a member sensitive to combustion conditions that obtain in said combustion chamber for controlling the movement of said movable contact member, and a connection between said sensitive member and said movable contact member for moving said movable contact member relatively to said spaced electrodes to close said electric switch when said sensitive member is relatively hot and to open said electric switch when said sensitive member is relatively cold.

17. A fuel burning device comprising a combustion chamber, electrically controlled means for supplying a fuel mixture therein, and an electrical control circuit for said fuel projecting means, said control circuit comprising a room thermostat for initiating operation of said control circuit, and an electrical safety control mechanism for preventing the supply of the fuel mixture upon an initial failure of ignition or a failure of combustion conditions after ignition, said safety control mechanism comprising spaced contacts, a movable contact member adapted to control the electrical circuit through said spaced contacts, a thermal element sensitive to combustion conditions obtaining in said combustion chamber for actuating said movable contact member, and a connection between said thermal member and said movable contract member whereby the electrical circuit between said spaced contacts and said movable contact member is completed when said thermal member is relatively hot and is interrupted when said thermal member is relatively cold.

18. A fuel burning device comprising a combustion chamber, electrically controlled means for supplying a fuel mixture into a zone of ignition therein, and an electrical circuit controlling the operation of said fuel supplying means, said electrical control circuit comprising a room thermostat which initiates operation of said control circuit, and an electrical safety control mechanism for preventing the supply of the fuel mixture upon an initial failure of combustion in said combustion chamber or failure of combustion conditions therein after initiation, said safety control mechanism comprising spaced contacts controlling the electrical circuit, a movable contact member adapted to control the electrical circuit through said spaced contacts, a member sensitive to combustion conditions that obtain within said combustion chamber, and a connection operated by said sensitive member for actuating said movable contact member, said contact members including said movable contact member being so arranged as to complete the electrical circuit therebetween when said sensitive member is relatively hot and to interrupt the electrical circuit therebetween when said sensitive member is relatively cold.

19. A system for controlling a fuel burning device, comprising fuel supply means, an electric motor therefor, a circuit for said motor, a room thermostatic switch, an electrically heated relay the electric heater circuit of which is connected in circuit with said room thermostatic switch, and switching means embodied in said relay and automatically actuable solely through said relay for controlling said motor circuit.

20. In a fuel burning system, the combination with a combustion chamber, of means for supplying fuel thereto, an electric motor for said fuel supplying means, a circuit for said motor, a room thermostatic switch, an electrically heated relay the electric heater circuit of which is connected in circuit with said room thermostatic switch, switching means embodied in said relay and automatically actuable solely through said relay for controlling said motor circuit, and safety control means responsive to combustion conditions obtaining in said combustion chamber for controlling the operation of said relay.

21. In a fuel burning system, the combination with a combustion chamber, of electrically controlled means for supplying fuel thereto, a temperature control thermostat, a thermostatically controlled actuator, an electric heating element for said actuator the circuit of which is connected in circuit with said thermostat, an electric switch for controlling said fuel supplying means, said electric switch being controlled by said actuator alone to maintain energization of said fuel supplying means temporarily, and safety control means comprising a thermo sensitive element influenced by combustion conditions obtaining in said combustion chamber, said safety control means supplementing the control of said electric switch to maintain energization of said fuel supplying means as long as combustion obtains in said combustion chamber.

22. In a fuel burning system, the combination with a combustion chamber of electrically controlled means for supplying fuel thereto, an electrically heated thermostatic actuator, an electric switch operable by said actuator for initially controlling the energization of said fuel supplying means, a thermo sensitive element influenced by combustion conditions obtaining in said combustion chamber, and a switch operable by said element, said last-mentioned switch being connected in parallel circuit relation to said first-mentioned switch to maintain energization of said fuel supplying means independently of said first-mentioned switch as long as combustion obtains in said combustion chamber.

23. In a fuel burning system, the combination with fuel supply means and an electric motor therefor, of a control system for said motor, said control system comprising an element capable of being electrically energized to effect operation of said motor, a room thermostatic switch, a control switch arranged to cooperate with said room thermostatic switch to effect initial energization of said element, and a supplemental switch arranged to maintain subsequent energization of said element subject to the operation of said room thermostatic switch, said control switch being relatively slow in its operation to prevent immediate reenergization of said element after deenergization thereof in response to the operation of said room thermostatic switch.

24. In a fuel burning system, in combination, a combustion chamber, ignition means therein, fuel supply means, an electric motor therefor, and a control system for said motor, said control system comprising an element capable of being electrically energized to effect operation of said motor, a room thermostatic switch for normally controlling the energization of said element, and a safety control mechanism for rendering said element ineffective to maintain energization of said motor upon failure of ignition in said combustion chamber or upon failure of combustion after ignition and for preventing reenergization of said element immediately after the termination of a period of combustion, said safety control mechanism comprising a member sensitive to combustion conditions obtaining in said combustion chamber, a switch operable by said member, and a switch operable in response to the energization of said electrically energizable element, said last-mentioned two switches being respectively disposed in two parallel-connected circuit branches.

25. In a fuel burning system, in combination, a combustion chamber, ignition means therein, fuel supply means, an electric motor therefor, an element capable of being electrically energized to effect energization of said motor, and means for controlling the energization of said element to effect energization of said motor under predetermined conditions but to interrupt energization of said motor upon failure of ignition in said combustion chamber or upon failure of combustion after ignition and to prevent reenergization of said motor immediately after the termination of a period of combustion, said controlling means comprising a plurality of switches disposed in circuit controlling relation to said element, one of which switches is so constructed as to require a substantial interval of time to move from open to closed position, and a member sensitive to combustion conditions obtaining in said combustion chamber for controlling the operation of one of said switches.

26. In a burner control system, a room thermostat circuit, a burner motor started in response to closure of said circuit and stopped in response to opening thereof, an igniter and means for interposing a delay between successive motor energizations.

27. A burner control system comprising a burner motor, a timing device adapted to close the switch thereof, a room thermostat adapted to start said device in action and a circuit whereby the thermostat holds said switch closed.

In testimony whereof, I have subscribed my name this 15th day of January, 1932.

LOUIS A. M. PHELAN.

In testimony whereof, I have subscribed my name this 20th day of January, 1932.

CLIFFORD HOTCHKISS.